Feb. 16, 1932.  E. GREEN  1,845,707
SAFETY TUBING HOOK
Filed Feb. 24, 1930
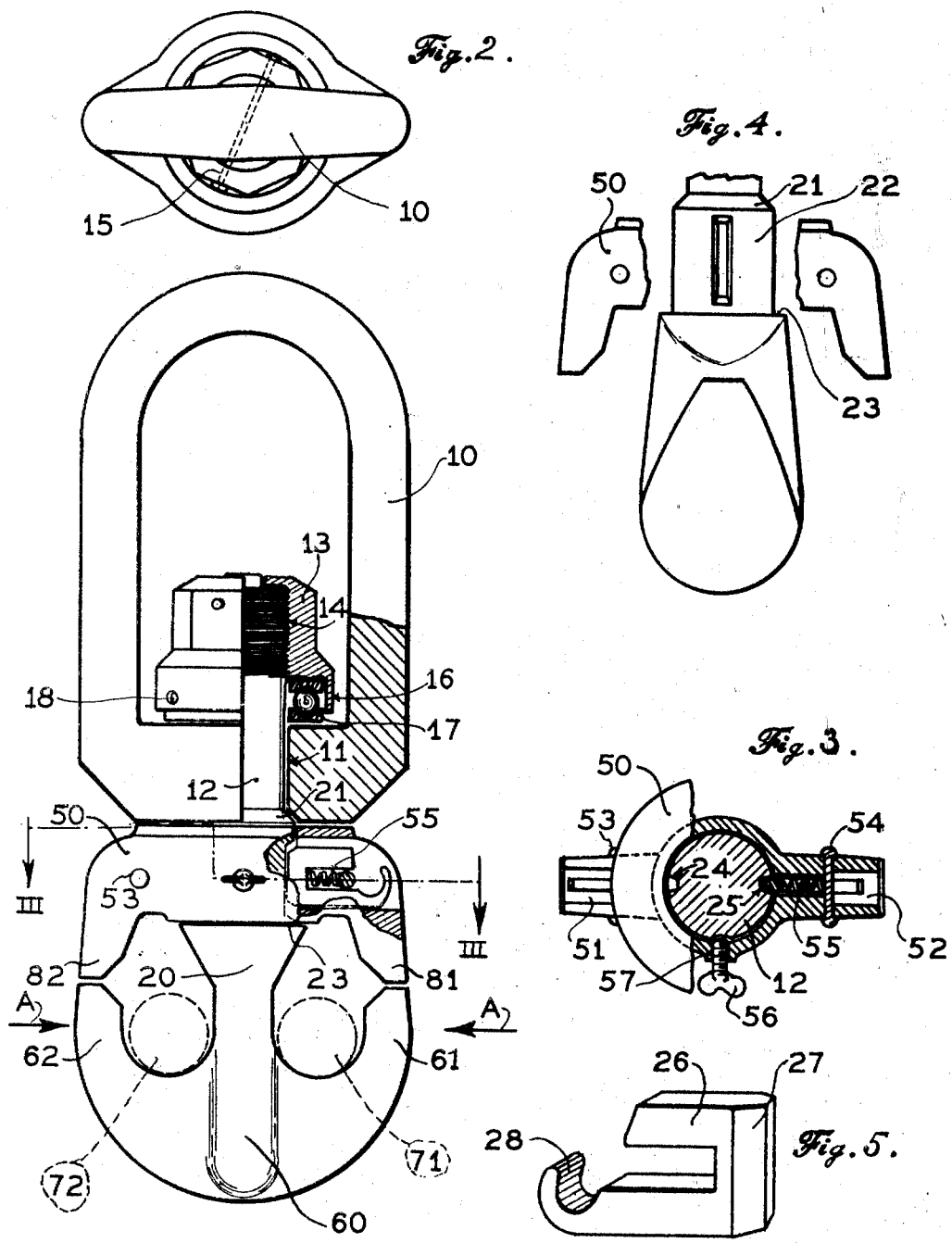
Inventor
ELLIS GREEN
By
Tom G. Boman.  Attorney Patented Feb. 16, 1932

1,845,707

UNITED STATES PATENT OFFICE

ELLIS GREEN, OF TULSA, OKLAHOMA, ASSIGNOR TO FINISHED STEEL PRODUCTS CO., OF PINE BLUFF, ARKANSAS, A CORPORATION OF ARKANSAS

SAFETY TUBING HOOK

Application filed February 24, 1930. Serial No. 430,676.

My invention relates to a coupling device and more particularly to a safety hook adapted for use in the oil fields.

In inserting and removing strings of tubing, casing, and the like in and from wells, it is necessary to fasten and detach the traveling block to and from the elevator's links and this manipulation should be accomplished quickly and safely.

As is well known to those skilled in this branch of the oil industry, many types of safety hooks are used to perform the above recited connection but these are more or less deficient in that the breakage of the single prong of the hook will allow the load to fall.

Now, in my improved hook, I provide a double seat for the depending linkage whereby breakage of one prong of the hook will not allow the load to fall as the other prong will sustain the load. Thus a double safety factor is provided.

Another advantage of my improved hook lies in its latching feature. It will be noted that although there are two entrances to the seats nevertheless both of these may be closed by a single turning movement of the latching member. Moreover, closing occurs simultaneously and the rotative movement may be in either direction.

Another feature of my invention is my positive locking arrangement which prevents rotation of the latching member when it is in its desired position. This consists of a set screw which is tightened to its position against the stem of the hook by means of wings thereon. In addition to the set screw means I provide spring pressed sliding means which holds the latching member in its closed position. Either holding means may be used independently of the other.

Other features are the construction of the cap nut which shields the ball bearing race against the entrance of foreign matter and the cored construction of the latching member which allows for complete housing of the spring pressed locking means.

Still further objects or advantages subsidiary or incidental to the aforesaid objects, or resulting from the construction or operation of the invention as it may be carried into effect, will become apparent as the said invention is hereinafter further disclosed.

Figure 1 is a side view of the preferred form of my invention, parts being broken away in order to clarify the showing.

Figure 2 is a top view of Figure 1.

Figure 3 is a view taken along the line III—III of Figure 1 showing particularly the construction of the rotating latching or locking member.

Figure 4 is a view taken from either of the directions indicated by the arrows —A—, Figure 1, part of the latching mechanism being broken away.

Figure 5 is a perspective view of the slide or locking means.

Similar numerals indicate similar parts throughout the several views.

Referring particularly to Figures 1 and 2, numeral —10— designates the link or support adapted to be suspended by any suitable means (not shown). The thickened enlarged base portion of this link is round in plan configuration as shown in Figure 2 and has a hole —11— therethrough for receiving the stem —12— of the hook member or swivelled means —20—.

A cap or nut —13— is fastened to the top of the stem as at —14— and locked thereto by means of the pin —15—. The bottom of the nut rests upon the ball bearing unit —17— and a depending flange —16—, having an oil hole —18—, protects the ball bearing unit from dirt and the like.

The hook member or swivelled means —20— is shouldered as at —21— to prevent upward movement of the same and enlarged at —22— to form a bearing surface for the turning unit or latching member —50—. A lower shoulder —23— prevents downward movement of the revoluble latching member.

Tapered grooves —24— and —25—, see Figure 3, provide seats for the tapered ends —27— of the slide or locking means —26—. The latching member —50— is recessed as shown at —51— and —52— and pins —53— and —54— extend through these recesses and provide abutting means for the springs —55— which tend to keep the slides seated thereby preventing rotation of the latching means.

The slides are provided with thumb lugs —28— whereby they may be pulled outwardly thus permitting rotation of the latching member to occur. A thumb set screw —56— is threaded into the lower portion of the latching member as at —57— and serves as a positive lock against rotation of the latching member.

The hook member or swivelled means —20— has a bottom portion —60— which terminates into two upwardly and outwardly extending prongs —61— and —62—. Thus seats are provided for the links, —71— and —72—, shown in dotted construction in Figure 1, and each seat operates independently of the other.

The latching mechanism has depending prongs —81— and —82— which coact with the prongs previously mentioned.

The operation is readily understood. When the hook is ready for engagement, the latching member is turned at an angle relative to the bottom prongs and thus the links of the elevator may be readily placed in their respective seats. Next, the latching member is turned right or left and both slides or latches click "home" as the upper prongs come into vertical alinement with the lower prongs. Next, the set screw is tightened and positive locking obtained.

What I claim is:

1. A tubing hook consisting of a link having a hole therein, a hook member having a stem adapted to be inserted through said hole, threads near the end of the stem and a shoulder adjacent the end of the stem, a ball bearing unit circumposed about the stem and resting on the link and a cap member having interior threads adapted to coact with the threads on the stem, said cap member also having a shoulder adapted to abut against the shoulder on the stem whereby the threaded engagement between the stem and cap member is positively limited, said cap member extending down over the ball bearing unit.

2. An apparatus consisting of a stem having a groove therein, a prong extending upwardly from the bottom of the stem, a latching member revolubly mounted on the stem and adapted to swing in a plane just above the upper end of the prong, said latching member having a recess alined with and opening into the aforesaid groove when the latching member is in a certain predetermined circumferential position, a slide mounted in said recess, said slide having a tapered inner end and formed into a thumb lug on its outer end, and spring means adapted to push the slide inwardly against the stem.

3. A safety hook comprising a stem having grooves therein, means for supporting said stem, two upwardly and outwardly extending prongs on the stem, a latching member rotatably mounted upon said stem, said latching member having recesses therein adapted to aline with the aforesaid grooves when the latching member is in locked position, and sliding means mounted in said recesses and adapted to enter said grooves whereby the latching member is locked in position.

4. A safety hook as set forth in claim 3 but further characterized by additional locking means interposed between the latching member and the stem.

5. A tubing hook consisting of a link having a hole therein, a hook member having a stem adapted to be inserted upwardly through said hole, a shoulder on said stem to prevent excessive upward movement of the stem, locking means near the top of the stem, two oppositely disposed prongs rigid with and extending upwardly and outwardly from the bottom of the stem, said stem having an upwardly facing shoulder slightly above the terminal plane of the aforesaid prongs, a latching member revolubly mounted upon said shoulder and adapted to close the openings to the inner sides of the prongs and means to lock the latching member in closed position.

6. A tubing hook comprising the elements of claim 5 in which the stem has grooves formed therein and the locking means comprises slidable spring pressed means adapted to engage in said grooves.

7. A tubing hook consisting of a link having a hole therein, a hook member having a stem adapted to be inserted upwardly through said hole, means to prevent excessive upward movement of the stem, locking means near the top of the stem, two oppositely disposed prongs rigid with and extending upwardly and outwardly from the bottom of the stem, said stem having an upwardly facing shoulder slightly above the terminal plane of the aforesaid prongs, latching member revolubly mounted upon said shoulder and adapted to close the openings to the inner side of the prongs and means to lock the latching member in closed position.

In testimony whereof I affix my signature.

ELLIS GREEN.